(12) United States Patent
Tertel et al.

(10) Patent No.: US 9,393,526 B2
(45) Date of Patent: Jul. 19, 2016

(54) PROCESS FOR REMOVING ONE OR MORE SULFUR COMPOUNDS AND AN APPARATUS RELATING THERETO

(71) Applicant: UOP, LLC, Des Plaines, IL (US)

(72) Inventors: Jonathan Andrew Tertel, Mt. Prospect, IL (US); Aziz Sattar, West Chicago, IL (US); Bhargav Sharma, Niles, IL (US)

(73) Assignee: UOP LLC, Des Plaines, IL (US)

( * ) Notice: Subject to any disclaimer, the term of this patent is extended or adjusted under 35 U.S.C. 154(b) by 287 days.

(21) Appl. No.: 13/929,874

(22) Filed: Jun. 28, 2013

(65) Prior Publication Data

US 2015/0005562 A1    Jan. 1, 2015

(51) Int. Cl.

| | |
|---|---|
| *B01D 63/02* | (2006.01) |
| *B01D 61/00* | (2006.01) |
| *C10L 3/10* | (2006.01) |
| *B01D 53/52* | (2006.01) |
| *B01D 53/75* | (2006.01) |
| *B01D 53/78* | (2006.01) |
| *C10G 70/06* | (2006.01) |
| *B01D 53/14* | (2006.01) |
| *B01D 53/22* | (2006.01) |

(52) U.S. Cl.
CPC .............. *B01D 63/02* (2013.01); *B01D 53/229* (2013.01); *B01D 53/52* (2013.01); *B01D 53/75* (2013.01); *B01D 53/78* (2013.01); *B01D 61/00* (2013.01); *C10G 70/06* (2013.01); *C10L 3/103* (2013.01); *B01D 53/1468* (2013.01); *B01D 2053/224* (2013.01); *B01D 2251/2062* (2013.01); *B01D 2251/304* (2013.01); *B01D 2251/306* (2013.01); *B01D 2251/604* (2013.01); *B01D 2252/20484* (2013.01); *B01D 2252/20489* (2013.01); *B01D 2256/24* (2013.01); *B01D 2257/306* (2013.01); *C10G 2400/26* (2013.01); *C10L 2290/541* (2013.01); *C10L 2290/544* (2013.01); *C10L 2290/548* (2013.01)

(58) Field of Classification Search
None
See application file for complete search history.

(56) References Cited

U.S. PATENT DOCUMENTS

| | | | |
|---|---|---|---|
| 3,956,112 | A | 5/1976 | Lee et al. |
| 4,481,106 | A | 11/1984 | Verachtert |
| 4,562,300 | A | 12/1985 | LaFoy |
| 4,961,759 | A | 10/1990 | Taylor |
| 4,976,869 | A | 12/1990 | Taylor |
| 5,149,340 | A | 9/1992 | Waycuilis |
| 5,244,643 | A | 9/1993 | Verachtert |

(Continued)

FOREIGN PATENT DOCUMENTS

CN    1785480 A    6/2006

OTHER PUBLICATIONS

Sutrasno et al., "Performance of Hollow Fiber Membrane Gas-Liquid Contactors to Absorb CO2 Using Diethanolamine (DEA) as a Solvent", Makara of Technology, Nov. 2009, vol. 13, No. 2, pp. 86-90.

(Continued)

*Primary Examiner* — Tam M Nguyen

(57) ABSTRACT

An exemplary embodiment can be a process for removing one or more sulfur compounds in a gas hydrocarbon stream. The process may include feeding the gas hydrocarbon stream to a prewash zone containing an alkali stream and passing the gas hydrocarbon stream from the prewash zone to an extraction zone. Usually, the gas hydrocarbon stream includes one or more sulfur compounds and the prewash zone includes a hollow fiber membrane.

18 Claims, 3 Drawing Sheets

(56) References Cited

U.S. PATENT DOCUMENTS

| | | | |
|---|---|---|---|
| 5,863,420 A | 1/1999 | Kwasniewski et al. |
| 6,059,857 A | 5/2000 | Ray et al. |
| 6,755,975 B2 | 6/2004 | Vane et al. |
| 7,223,332 B1 | 5/2007 | Tertel |
| 7,326,333 B2 | 2/2008 | Laricchia et al. |
| 7,381,309 B1 | 6/2008 | Laricchia et al. |
| 7,981,278 B2 | 7/2011 | Kamio et al. |
| 8,028,975 B2 | 10/2011 | Tertel et al. |
| 2007/0286783 A1 | 12/2007 | Carrette et al. |
| 2010/0122784 A1 | 5/2010 | Jemaa et al. |
| 2011/0163008 A1 | 7/2011 | Zhang et al. |
| 2011/0185896 A1 | 8/2011 | Sethna et al. |
| 2012/0048779 A1 | 3/2012 | Zhang et al. |
| 2013/0026086 A1 | 1/2013 | Zhang et al. |

OTHER PUBLICATIONS

Yang et al., "Removal of Mercaptans from Oil by Hollow Fiber Membrane-Based Extraction", Journal of Chemical Engineering of Chinese Universities, Oct. 2008, vol. 22, No. 5, pp. 762-767.
U.S. Appl. No. 13/602,469, filed Sep. 4, 2012, Tertel et al., now abandoned.
U.S. Appl. No. 13/585,188, filed Aug. 14, 2012, Laricchia et al.
U.S. Appl. No. 13/602,530, filed Sep. 4, 2012, Tertel et al.
U.S. Appl. No. 13/602,638, filed Sep. 4, 2012, Tertel et al.
U.S. Appl. No. 13/929,885, filed Jun. 28, 2013, Tertel.

PROCESS FOR REMOVING ONE OR MORE SULFUR COMPOUNDS AND AN APPARATUS RELATING THERETO

FIELD OF THE INVENTION

This invention generally relates to a process for removing one or more sulfur compounds in a gas hydrocarbon stream and an apparatus relating thereto.

DESCRIPTION OF THE RELATED ART

Typically, hydrogen sulfide is present in fuel gas streams, and is removed to very low levels prior to extraction. Usually, the bulk removal is done in an amine absorber, which can decrease the level to no more than about 100 wppm hydrogen sulfide. Additional removal of hydrogen sulfide may be done in a caustic prewash to reduce hydrogen sulfide levels to no more than 5 wppm. Often, an alkali stream, such as sodium hydroxide, is intimately mixed with a fuel gas in a trayed or packed bed column, but such columns may not be suited for all applications, such as off-shore, where rocking complicates a design.

After prewashing, mercaptan is often extracted from fuel gas streams in order to meet required product specifications. Currently, this is done predominantly using caustic in either a trayed or packed bed column, counter-currently contacting the gas with an alkaline solution, such as caustic. This column can require a large number of trays, typically 15-20, in a vertical vessel. Also, for off-shore applications as mentioned above, the rocking motion can add complexity to tray design. Additionally, carbonyl sulfide is extracted along with hydrogen sulfide from fuel gas streams in order to meet required product specifications. Currently, an amine and caustic mixture, such as a carbonyl sulfide solvent, may be provided in either a trayed or packed bed column. Usually, such carbonyl sulfide removal is conducted downstream from a mercaptan extraction step, and this removal may be post treatment by a water wash to ensure that all of an aqueous phase can be removed from the hydrocarbon. Hence, it would desirable to provide a more efficient removal of such compounds and, in some instances, not rely on downstream operations for their removal.

SUMMARY OF THE INVENTION

An exemplary embodiment can be a process for removing one or more sulfur compounds in a gas hydrocarbon stream. The process may include feeding the gas hydrocarbon stream to a prewash zone containing an alkali stream and passing the gas hydrocarbon stream from the prewash zone to an extraction zone. Usually, the gas hydrocarbon stream includes one or more sulfur compounds and the prewash zone includes a hollow fiber membrane.

Another exemplary embodiment may be a process for removing one or more sulfur compounds in a gas hydrocarbon stream. The process may include feeding the gas hydrocarbon stream having one or more sulfur compounds to a prewash zone containing an alkali stream and passing the gas hydrocarbon stream from the prewash zone to an extraction zone. Often, the extraction zone includes a hollow fiber membrane.

A further exemplary embodiment may be an apparatus for removing one or more sulfur compounds from a gas hydrocarbon stream. The apparatus may include a prewash vessel having a cylindrical wall containing one or more trays, and a hollow fiber membrane including at least one tube and a shell for removing one or more sulfur compounds from the gas hydrocarbon stream.

The embodiments disclosed herein can provide a hollow fiber membrane to extract hydrogen sulfide and carbonyl sulfide from a fuel gas stream into an aqueous solvent stream containing an amine, such as monoethanolamine or diethanolamine, alkali, such as sodium hydroxide or potassium hydroxide, and water. In one exemplary embodiment, the hollow fiber membrane can be used to remove the hydrogen sulfide by routing an alkali, such as sodium hydroxide, having about 5-about 15%, by weight, as a solvent on one side of the membranes with hydrocarbon on the other side. The hydrogen sulfide can be transferred at the pores of the membrane from the hydrocarbon to the alkali solvent, where the hydrogen sulfide can react and be chemically bound. Both sides of the membrane may be kept at almost the same pressure to limit the amount of dispersive mixing, thus reducing or eliminating the need for downstream removal of the solvent from the hydrocarbon. Preferably, the contacting takes place prior to extraction.

In another exemplary embodiment, a hollow fiber membrane may extract one or more thiol compounds, such as methyl and ethyl thiol compounds, from a fuel gas stream into a lean caustic stream. The lean caustic stream may be routed through one side of the hollow fiber membrane with the hydrocarbon on the other side of the hollow fiber membrane. The one or more thiol compounds can be transferred at the pores of the membrane from the hydrocarbon to the alkali, where the alkali may react to convert to sodium mercaptide. Both sides of membrane may be at almost the same pressure to minimize the amount of dispersive mixing, thus reducing or eliminating the need for downstream removal of the alkali from the hydrocarbon. Thus, the volumetric amount of alkali to hydrocarbon can be reduced thereby reducing the amount of back extraction of disulfide oil from the alkali back into the hydrocarbon.

DEFINITIONS

As used herein, the term "stream" can include various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons. Moreover, the hydrocarbon molecules may be abbreviated C1, C2, C3 . . . Cn where "n" represents the number of carbon atoms in the one or more hydrocarbon molecules. Furthermore, a superscript "+" or "−" may be used with an abbreviated one or more hydrocarbons notation, e.g., $C3^+$ or $C3^-$, which is inclusive of the abbreviated one or more hydrocarbons. As an example, the abbreviation "$C3^+$" means one or more hydrocarbon molecules of three carbon atoms and/or more. In addition, the term "stream" may be applicable to other fluids, such as aqueous and non-aqueous solutions of an alkali, such as sodium hydroxide.

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "rich" can mean an amount of generally at least about 50%, preferably about 70%, by mole, of a compound or class of compounds in a stream. If referring to a solute in solution, e.g., one or more thiol compounds in an alkaline solution, the term "rich" may be referenced to the equilibrium concentration of the solute. As an example, about 5%, by mole, of a solute in a solvent may be considered rich if the concentration of solute at equilibrium is about 10%, by mole.

As used herein, the term "substantially" can mean an amount of at least generally about 80%, preferably about 90%, and optimally about 99%, by mole, of a compound or class of compounds in a stream.

As used herein, the term "parts per million" may be abbreviated herein as "ppm" and "weight ppm" may be abbreviated herein as "wppm". Generally, parts per million is based on weight unless otherwise indicated.

As used herein, the term "alkali" can mean any substance that in solution, typically a water solution, has a pH value greater than about 7.0, and exemplary alkali can include sodium hydroxide, potassium hydroxide, or ammonia. Such an alkali in solution, usually a water solution, may be referred to as an alkaline solution or an alkaline.

As used herein, the term "thiol" can include a mercaptan and a salt thereof, such as a mercaptide. A thiol can be of the formula RSH or a salt of the formula $RS^-M^+$ where R is a hydrocarbon group, such as an alkyl or aryl group, that is saturated or unsaturated and optionally substituted, and M is a metal, such as sodium or potassium.

As used herein, the weight percent or ppm of sulfur, e.g., "wppm-sulfur" is the amount of sulfur in a hydrocarbon stream and not the amount of the sulfur-containing species unless otherwise indicated. As an example, methylthiol, $CH_3SH$, has a molecular weight of 48.1 with 32.06 represented by the sulfur atom, so the molecule is about 66.6%, by weight, sulfur. As a result, the actual sulfur compound concentration can be higher than the wppm-sulfur from the compound.

As used herein, the term "lean alkaline solution" is an alkaline solution having been treated and having desired levels of sulfur, including one or more thiol compounds and/or one or more disulfides for treating one or more C1-C4 hydrocarbons in an extraction zone.

As used herein, the term "fuel gas" can include one or more C1-C4 hydrocarbons and have molecules substantially in a gas phase.

As used herein, the term "kilopascal" may be abbreviated "KPa" and all pressures disclosed herein are absolute.

As depicted, process flow lines in the figures can be referred to interchangeably as, e.g., lines, pipes, liquids, solutions, alkalines, alkaline solutions, caustic, feeds, products, or streams.

DETAILED DESCRIPTION

Figure 1:
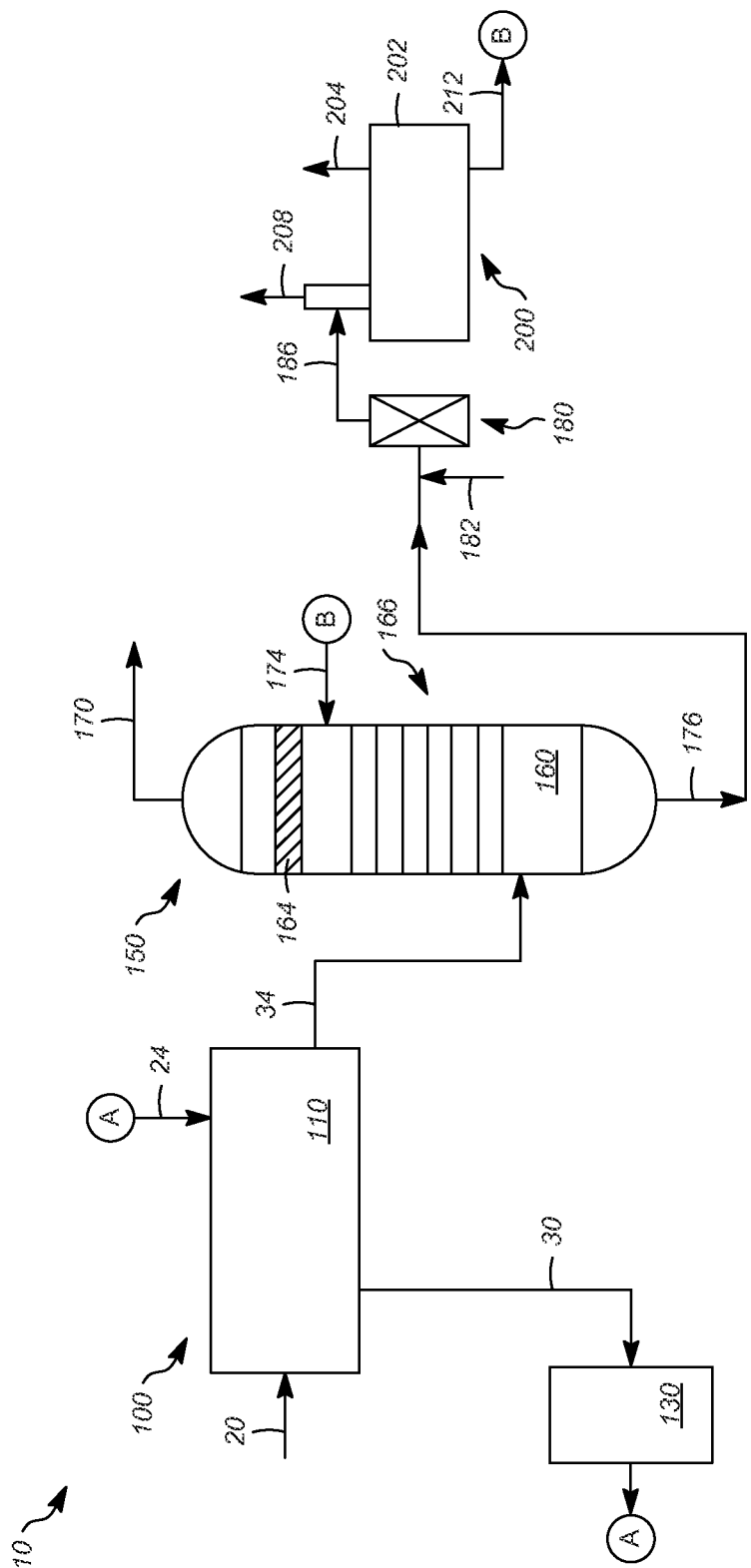
FIG. 1 is an schematic depiction of an exemplary apparatus.

Referring to FIG. 1, an exemplary apparatus 10 for producing a hydrocarbon fuel, such as a fuel gas rich in or substantially including one or more $C4^-$ hydrocarbons, can include a prewash zone 100 having a hollow fiber membrane 110, an extraction zone or mass transfer zone 150 including a thiol extraction vessel 160, a thiol oxidation zone 180, and a separation zone 200. The apparatus 10 can extract one or more thiol compounds present in a gas hydrocarbon stream or feed 20 and convert them into one or more disulfide compounds, typically referred to as disulfide oils, in the thiol oxidation zone 180. The hydrocarbon feed 20 can include hydrocarbons boiling in the range of a fuel gas and can be rich in or substantially include one or more $C4^-$ hydrocarbons. The hydrocarbon feed 20 can be substantially in a gas phase. Often, the hydrocarbon feed 20 is provided at a temperature of about 30-about 50° C., and a pressure of no more than about 7,000 KPa, and often about 400-about 1,900 KPa.

The hydrocarbon feed 20 including one or more thiol compounds can be contacted in the prewash zone 100 including the hollow fiber member 110. Although one hollow fiber membrane 110 is depicted, any number of hollow fiber membranes in series and/or parallel may be utilized.

Figure 2:
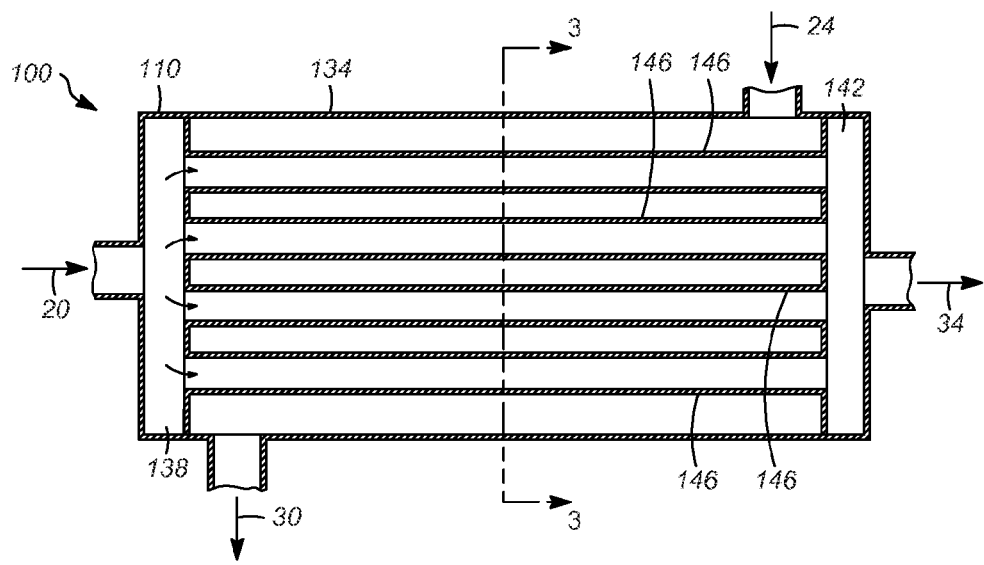
FIG. 2 is an elevational, cross-sectional depiction of an exemplary hollow fiber membrane.
Figure 3:
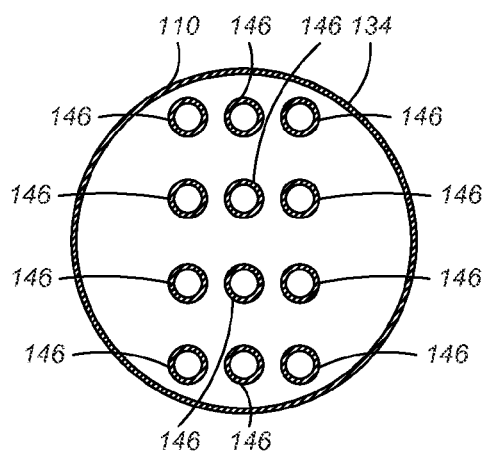
FIG. 3 is an elevational, cross-sectional depiction along line 3-3 of FIG. 2.

Referring to FIGS. 2 and 3, the hollow fiber membrane 110 can include a shell 134 with a first chamber 138, a second chamber 142, and at least one tube 146. In this exemplary embodiment, the hollow fiber membrane 110 can include twelve tubes 146, although the hollow fiber membrane 110 can include any suitable number of tubes, including multiple tubes of thousands of tubes. The hollow fiber membrane 110 may have hydrophobic and hydrophilic properties and include at least one of a ceramic, cellulose acetate, polypropylene, polysulfone, polyamide, and polytetrafluoroethylene.

Referring back to FIG. 1, an alkali stream or solvent stream 24, typically a lean alkaline solution of sodium hydroxide, potassium hydroxide, or ammonia, in an aqueous solution, can be provided to the prewash zone 100 for extracting hydrogen sulfide and carbon dioxide. The alkaline solution can be of any suitable strength, such as at least about 5%, or about 15%, by weight, of an alkali including sodium hydroxide, potassium hydroxide, or ammonia, in a solution with, e.g., water, based on the weight of the alkaline solution. Alternatively, the alkaline solution can be of any suitable strength, such as no more than about 20%, no more than about 10%, by weight, of an alkali including sodium hydroxide, potassium hydroxide, or ammonia, in a solution with, e.g., water, based on the weight of the alkaline solution. In yet another exemplary embodiment, the alkaline solution can be about 5-about 15%, by weight, of alkali, with the balance being water. Preferably, the solvent has about 5-about 15%, by weight, sodium hydroxide with the balance water.

In another exemplary embodiment, the solvent stream 24 can include an amine, particularly if the removal of carbonyl sulfide and/or carbon dioxide is desired in addition to hydrogen sulfide. Typically, the solvent stream 24 includes about 1:2-about 2:1 of an alkali:alkanolamine solution with the balance water. Preferably, the alkanolamine may include at least one of monoethanolamine, diethanolamine, and methyl diethanolamine, preferably monoethanolamine and/or diethanolamine. In one exemplary embodiment, the solvent stream 24 can include about 5-about 20% of an alkanolamine and/or an alkali with the balance being water, and preferably up to about 10%, by weight, independently, of alkanolamine and alkali with the balance being water.

Generally, the walls of the tubes 146 can be porous. As the liquid from one of the streams 20 and 24 fill the pores, a liquid-liquid extraction can occur with the tubes 146 maintaining phase separation. Usually, the one or more soluble thiols permeate through the tubes 146 more quickly as compared to the alkaline.

Although the tubes 146 are described as porous, non-porous tubes can be used as well. The transfer through a non-porous, solvent-swelled membrane is by diffusion, a process of mass transfer that can occur as a movement of individual molecules. This movement of the solute in the extraction process can be induced by the partition coefficient of the solute in the two immiscible solvents. A non-porous, swelled membrane may be viewed as a form of gel. The solvents and solute involved in the extraction all interact with the membrane to form a single phase, polycomponent system. Such non-porous membranes are disclosed in, e.g., U.S. Pat. No. 3,956,112.

Although a single hollow fiber membrane 110 is depicted, it should be understood that two or more hollow fiber membranes may be utilized in parallel and/or series. Moreover, the alkali stream 24 may be routed to a shell side of a hollow fiber membrane bundle with the prewashed hydrocarbon stream 20 routed to the tube side, although the alkali stream 24 may be routed to a tube side and the prewashed hydrocarbon stream 20 may be routed to a shell side. Although a counter-current flow scheme is disclosed, it should be understood the streams 20 and 24 can be introduced co-currently.

A partially spent alkali stream 30 can exit the hollow fiber membrane 110 and be recirculated to alkali stream 24 with some of the stream purged and a fresh solvent added. A surge vessel 130 may be added for additional capacity for this recirculated stream, which can exit at a point "A" and return at a point "A" as the solvent stream 24 depicted on FIG. 1. A prewashed stream 34 can be obtained from the prewash zone 100 and provided to the extraction zone 150, including a vessel 160. The vessel 160 may include a coalescer 164 and a plurality of trays 166 positioned underneath. Alternatively, packing may be used instead of trays. An alkali stream 174 can be received at a point "B" by the vessel 160 above the prewashed stream 34. Typically, the alkali stream 174 can contain about 5-about 20%, by weight, alkali with the balance water. The coalescer 164 may be a demister, such as a vane or mesh, made from any suitable metal, such as carbon or stainless steel. A gas phase can be contacted with the alkali stream 174 to further reduce the amount of thiol compounds. The gas phase can rise, pass through the coalescer 164 condensing any liquid droplets, and exit the vessel as a hydrocarbon product stream 170. This stream 170 can be sent to a water wash vessel for removing any entrained alkali prior to further processing.

The aqueous, alkali phase can drop and exit from the vessel 160 as a rich alkali stream 176. An air stream 182 including oxygen, such as air, and optionally an oxidation catalyst may be added with the rich alkali stream 176.

The oxidation catalyst can be any suitable oxidation catalyst, such as a sulfonated metal phthalocyanine. However, any suitable oxidation catalyst can be used, including those described in, e.g., U.S. Pat. No. 7,326,333. The optional oxidation catalyst, the air stream 182, and the rich alkali stream 176 may be mixed before entering the thiol oxidation zone 180. Generally, the rich aqueous alkaline solution and air mixture are distributed in the oxidizer reactor. In the oxidizer reactor, although not wanting to be bound by theory, the sodium salts of the thiol compounds react with oxygen and water to yield disulfide oil and caustic, i.e., sodium hydroxide, and organic disulfides. Optionally, the oxidizer reactor can include packing, such as carbon rings, to increase the surface area for improving contact between the thiol-tainted alkaline and catalyst.

Afterwards, an oxidation outlet stream 186 from the oxidizer reactor can be withdrawn. The oxidation outlet stream 186 can include a disulfide-tainted alkaline solution, one or more hydrocarbons, one or more sulfur compounds, and a gas. Typically, the oxidation outlet stream 186 can include a gas phase, a liquid disulfide phase, and a liquid aqueous alkaline phase. Generally, the gas phase includes air with at least some oxygen depletion. In the gas phase, the oxygen content can be about 5-about 21%, by mole.

The oxidation outlet stream 186 can be received in the separation zone 200. The separation zone 200 can include any suitable process equipment, such as a vessel or a disulfide separator 202, and can be operated at any suitable conditions, such as no more than about 60° C. and about 250-about 500 KPa.

A hydrocarbon-disulfide phase, an aqueous alkaline phase, and a gas phase including spent air may enter a stack of a disulfide separator 202 in the separation zone 200. Generally, the gas phase separates from the liquid phases. The liquid disulfide and aqueous alkaline phases can enter a body of the disulfide separator and segregate. Generally, the disulfide phase can exit as a stream 204 and one or more gases may exit a stack as a stream 208. Usually, at least a majority of the one or more disulfides are separated and removed from the alkaline solution. Often, the alkaline phase can exit the bottom of the disulfide separator as a regenerated alkali stream 212, which can optionally be further treated to remove, e.g., one or more disulfide compounds. The regenerated alkali stream 212 can be sent to a point "B" and after optionally further processing, be returned to the extraction zone 150 as, respectively, the stream 174 at the point "B". Exemplary oxidation zones and separation zones are disclosed in, e.g., U.S. Pat. No. 7,381,309 and U.S. Pat. No. 8,028,975.

Figure 4:
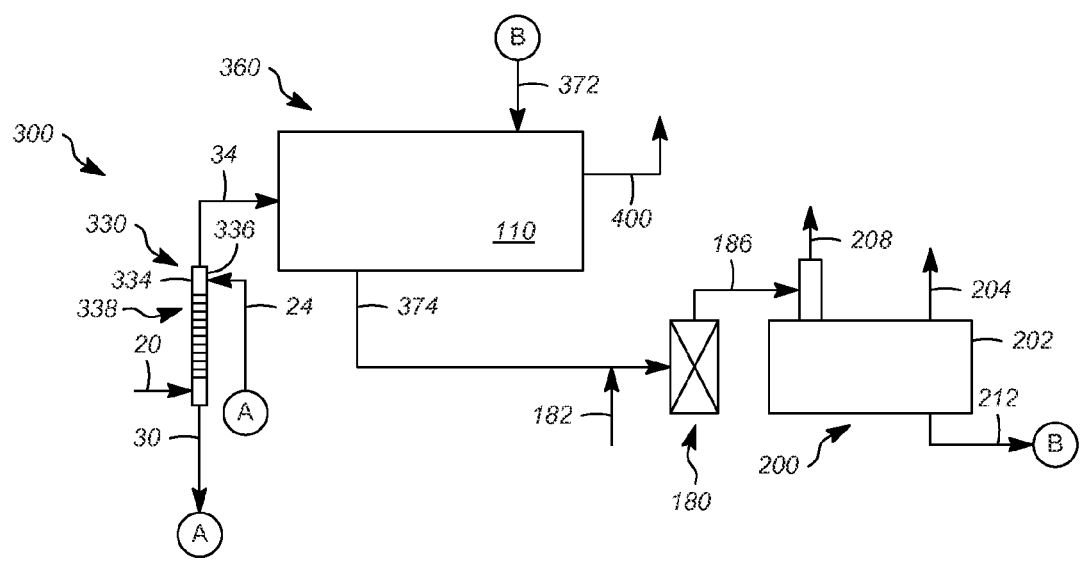
FIG. 4 is an schematic depiction of an exemplary additional apparatus.

Referring to FIG. 4, another exemplary apparatus 300 for removing one or more sulfur-containing compounds, such as one or more thiol compounds, from a hydrocarbon stream 20 can include a prewash zone 330, a mass transfer zone 360, a thiol oxidation zone 180, and a separation zone 200. The thiol oxidation zone 180 and the separation zone 200 can be similar to those described above. The gas hydrocarbon feed 20 and the solvent stream 24, as discussed above, can be provided to the exemplary apparatus 300, specifically to the prewash zone 330.

In this version, the prewash zone 330 can include a vessel 334 having a cylindrical wall 336 surrounding a plurality of trays 338. Alternatively, a packing may be used instead of the plurality of trays 338. The solvent stream 24 from a point "A" can be provided above an inlet for the gas hydrocarbon feed 20 and contacting may be facilitated as the solvent pours down and hydrocarbons rise through the plurality of trays 338. The partially spent solvent stream 30 can be withdrawn from the vessel 334, and be recirculated at the point "A" after optionally purging and adding make-up solvent. The hydrocarbon gases can rise and pass as the prewashed stream 34 sent to the mass transfer zone 360. Another exemplary prewash zone that can facilitate contacting hydrocarbons, alkaline, and oxygen is disclosed in, e.g., U.S. Pat. No. 5,244,643.

The mass transfer zone 360 can include the hollow fiber membrane 110, as described above. In this case, the prewashed stream 34 can be provided at one end of the hollow fiber membrane 110 and be contacted counter-currently with an alkali stream 372, similar to those described above, for extracting and/or sweetening hydrogen sulfide, one or more thiol compounds, and carbonyl sulfide. Typically, the alkali stream 372 can contain about 5-about 20%, by weight, alkali with the balance water. A rich alkali stream 374 can be provided to the thiol oxidation zone 180 and the separation zone 200, as discussed above. The regenerated alkali stream 212 may be provided at point "B" and returned at a point "B" as the alkali stream 372.

In yet another exemplary embodiment, which is not depicted, the prewash zone and the extraction and/or mass transfer zones can be incorporated into one or more hollow fiber membranes. In other words, a single or multiple hollow fiber membranes can accomplish the functionality of the prewash and extraction and/or mass transfer zones. Desirably, the prewash and extraction stages are done in separate, serial hollow membrane contactors to maintain separation of the solvent streams of different compositions.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for removing one or more sulfur compounds in a gas hydrocarbon stream, comprising:
    A) feeding the gas hydrocarbon stream comprising one or more sulfur compounds to a prewash zone containing an alkali stream wherein the prewash zone comprises a hollow fiber membrane to remove hydrogen sulfide; and
    B) passing the gas hydrocarbon stream from the prewash zone to an extraction zone to remove thiol compounds.

2. The process according to claim 1, wherein the alkali stream comprises at least one of an ammonia, a potassium hydroxide and a sodium hydroxide.

3. The process according to claim 1, wherein the hollow fiber membrane comprises at least one of a ceramic, cellulose acetate, polypropylene, polysulfone, polyamide, and polytetrafluoroethylene.

4. The process according to claim 1, wherein the hollow fiber membrane comprises at least one tube and a shell.

5. The process according to claim 4, wherein the gas hydrocarbon stream is provided to the at least one tube.

6. The process according to claim 5, wherein the at least one tube comprises multiple tubes.

7. The process according to claim 1, wherein the gas hydrocarbon stream comprises one or more $C4^-$ hydrocarbons.

8. The process according to claim 1, wherein the gas hydrocarbon stream upstream of the prewash zone is operated at a temperature of about 30-about 50° C., and a pressure of about 400-about 1,900 KPa.

9. The process according to claim 1, wherein the extraction zone comprises a vessel, in turn comprising a plurality of trays.

10. A process for removing one or more sulfur compounds in a gas hydrocarbon stream, comprising:
    A) feeding the gas hydrocarbon stream comprising one or more sulfur compounds to a prewash zone containing an alkali stream to remove hydrogen sulfide; and
    B) passing the gas hydrocarbon stream from the prewash zone to an extraction zone wherein the extraction zone comprises a hollow fiber membrane.

11. The process according to claim 10, wherein the prewash zone comprises a vessel with a plurality of trays.

12. The process according to claim 10, wherein the alkali stream comprises at least one of an ammonia, a potassium hydroxide and a sodium hydroxide.

13. The process according to claim 10, wherein the hollow fiber membrane comprises at least one of a ceramic, cellulose acetate, polypropylene, polysulfone, polyamide, and polytetrafluoroethylene.

14. The process according to claim 10, wherein the hollow fiber membrane comprises at least one tube and a shell.

15. The process according to claim 14, wherein the prewashed hydrocarbon stream is provided to the at least one tube.

16. The process according to claim 15, wherein the at least one tube comprises multiple tubes.

17. The process according to claim 10, wherein the gas hydrocarbon stream comprises one or more $C4^-$ hydrocarbons.

18. The process according to claim 10, wherein the gas hydrocarbon stream upstream of the prewash zone is operated at a temperature of about 30-about 50° C., and a pressure of about 400-about 1,900 KPa.

* * * * *